United States Patent
Kang

(10) Patent No.: US 6,843,974 B2
(45) Date of Patent: Jan. 18, 2005

(54) METHOD FOR EXTRACTING SILICA FROM HERBACEOUS PLANTS

(75) Inventor: Suck-Joon Kang, Kyunggi-Do (KR)

(73) Assignee: EE Ko Bio Co. (KR)

( * ) Notice: Subject to any disclaimer, the term of this patent is extended or adjusted under 35 U.S.C. 154(b) by 184 days.

(21) Appl. No.: 10/332,681

(22) PCT Filed: Jul. 6, 2001

(86) PCT No.: PCT/KR01/01156

§ 371 (c)(1),
(2), (4) Date: Jan. 9, 2003

(87) PCT Pub. No.: WO02/06157

PCT Pub. Date: Jan. 24, 2002

(65) Prior Publication Data

US 2003/0133863 A1 Jul. 17, 2003

(30) Foreign Application Priority Data

Jul. 13, 2000 (KR) .............................. 10-2000-0040317

(51) Int. Cl.$^7$ .............................................. C01B 33/12
(52) U.S. Cl. ........................ 423/335; 423/339; 423/345
(58) Field of Search ............................... 423/335, 337, 423/339, 345, 332; 110/346

(56) References Cited

U.S. PATENT DOCUMENTS

| | | | | |
|---|---|---|---|---|
| 4,248,844 A | * | 2/1981 | Ramsey et al. | 423/345 |
| 5,458,864 A | * | 10/1995 | Tsugeno et al. | 423/339 |
| 5,782,982 A | * | 7/1998 | Farone et al. | 127/37 |
| 5,833,940 A | * | 11/1998 | Reiber et al. | 423/334 |
| 6,406,678 B1 | * | 6/2002 | Shipley | 423/335 |
| 2003/0012720 A1 | * | 1/2003 | Victor et al. | 423/335 |
| 2003/0096900 A1 | * | 5/2003 | Holden | 524/492 |
| 2003/0097966 A1 | * | 5/2003 | Stephens et al. | 106/600 |

FOREIGN PATENT DOCUMENTS

| | | |
|---|---|---|
| JP | 52-136892 | 11/1977 |
| JP | 62-288110 | 12/1987 |

OTHER PUBLICATIONS

International Search Report, International Application No. PCT/KR 01/01156, International Filing Date Jul. 6, 2001, Date of Mailing of International Search Report Nov. 21, 2001.

* cited by examiner

*Primary Examiner*—Ngoc-Yen Nguyen
(74) *Attorney, Agent, or Firm*—Cantor Colburn LLP

(57) ABSTRACT

A method for extracting silica from herbaceous plant capable of extracting high purity amorphous silica from seed shell of various herbaceous plants is provided. The method includes carbonizing a herbaceous plant and pulverizing a carbide of the plant to a size of at least 50 mesh, adding at least 5% (w/w) aqueous alkaline solution based on 100 weight percents of the carbide, leaving a reactant of the solution and the carbide for 1 hour at about 45° C. and filtering the reactant, slowly heating the reactant to a predetermined temperature, dropping sulfuric acid to the reactant at the predetermined temperature until the sulfuric acid is neutralized, and evaporating and drying the reactant to produce silica.

7 Claims, 2 Drawing Sheets

METHOD FOR EXTRACTING SILICA FROM HERBACEOUS PLANTS

BACKGROUND OF THE INVENTION

1. Field of the Invention

The invention relates to a method for extracting silica from herbaceous plants, and more particularly a method for extracting silica from herbaceous plants, which is capable of extracting high purity amorphous silica from seed shell of various herbaceous plants.

2. Description of the Related Art

Silica is a compound of oxygen and silicon, commonly called silicon dioxide, which is one of the most abundant materials in the lithosphere. It is said that it exists in the lithosphere in great quantities, as much as comprising about 59% by weight of lithosphere.

The silica has been used in preparing various materials for building construction or durable materials including compressed glass, etc. In recent, as high purity silica powder is available, it is also possible to be applied as an additive in cosmetics, medications, semiconductors, films, waxes and fineceramics. Researches and studies are being conducted to seek a more improved method for producing high purity silica powder.

One conventional method commonly used to produce silica includes finely grinding an ore. The resulting powder is added to $Na_2CO_3$ and heated to a high temperature to form sodium silicates in different crystal forms, such as $Na_2SiO_4$, $Na_4SiO_4$ and $Na_2Si_2O_5$, etc. The sodium silicates are well soluble in water. An acid is added to the aqueous solution of such sodium silicates and heated, resulting in crystalline silica.

However, the silica obtained from minerals has a high hardness and contains a large amount of impurities. Therefore, it has a limitation in application as an additive for those which require high purity, such as medications, semiconductors and the like. Further, the conventional method has a defect that the quantity of produced silica is limited.

In recent, there are conducted researches and studies in a part to seek a method for extracting silica from various herbaceous plants.

In particular, it has been attempted to produce silica using rice hulls. The obtained silica has purity comparable to the silica from minerals, however it has high contents of crystals and high hardness. Thus, its application is limited.

SUMMARY OF THE INVENTION

Therefore, the present invention has been made in order to solve the above-described problems involved in the prior art and thus aims to provide a method for extracting silica from herbaceous plants, which is capable of extracting high purity amorphous silica from various herbaceous plants.

In order to achieve the above object, the present invention provides a method for extracting silica from herbaceous plants, comprising steps of carbonizing herbaceous plants, pulverizing the obtained carbide to particle size of at least 50 mesh, adding at least 5% (w/w) aqueous alkaline solution based on 100 weight percents of the carbonized particulates, leaving the reactants for 1 hour at about 45° C., followed by filtering, slowly heating the filtrate, adding dropwise sulfuric acid (purity >90%) to neutrality when the temperature of the filtrate reaches to 80° C. to 99° C., evaporating, drying, washing thoroughly and drying again the solution to give pure silica.

According to the present invention, firstly, the whole herbaceous plants including seed shell, etc. are carbonized and pulverized to particle size of at least 50 mesh. At least 5% (w/w) aqueous alkaline solution based on 100 weight percents of the carbonized particulates is then added to the carbonized particulates and the mixture is left for 1 hour at about 45° C., followed by filtration.

The carbonization of the herbaceous plants is carried out carefully so that the produced carbide does not turn to ashes by flame generated during the carbonization. The herbaceous plant carbide is pulverized so that the silica components can be readily extracted. The particle size is preferably at least 50 mesh, considering extracting time and easiness for extraction.

The addition of aqueous alkaline solution to the pulverized carbide allows the silica components contained in the carbide to be extracted. As the aqueous alkaline solution, a solution of alkaline material such as sodium hydroxide, lithium hydroxide, calcium hydroxide, sodium carbonate and the like, dissolved in water may be used. In the present invention, taking purchase and price into consideration, the aqueous solution of sodium hydroxide is added.

The concentration of the aqueous alkaline solution is not particularly limited, but preferably at least 5% (w/w), considering the quantity of the reaction system and aqueous solution to be added. The amount of the added aqueous alkaline solution is not critical to the present invention.

In practice, as alkaline material in the aqueous alkaline solution is increased, the amount of the extracted silica is uniformly increased. However, when the amount reaches to a certain amount, no more silica is extracted and the yield is fixed. Therefore, it is desirable to select an appropriate concentration and amount of the aqueous alkaline solution in accordance with conditions and environments of actual reaction.

As an instance, when 10% (w/w) sodium hydroxide aqueous solution was used, the yield was increased uniformly until 1500 weight percents of sodium hydroxide solution based on 100 weight percents of pulverized carbide is added. However, when the amount exceeds 1500 weight percents the yield was not changed any more.

Meanwhile, when adding the aqueous alkaline solution containing sodium hydroxide aqueous solution, the silica components extracted from the carbide to the solution are in the form of silicates such as sodium metasilicate ($Na_2SiO_3$), sodium methasilicate combined with crystal water ($Na_2SiO_3 \cdot nH_2O$), etc.

After addition of the aqueous alkaline solution, the solution is left for 1 hour at about 45° C. so that most of the silica in the carbide can be extracted. Then, the solution containing the extracted silica is subjected to a filtering process. The filtering is preferably repeated until the transparent filtrate is obtained, considering the color of the final product.

The filtrate is then heated to 80° C. to 99° C. While keeping this temperature, sulfuric acid (purity >90%) is added dropwise to neutrality. The resultant is dried and thoroughly washed and dried, resulting in pure silica.

As described above, the sulfuric acid added to the filtrate reacts with compounds existed in the solution, i.e. sodium metasilicate ($Na_2SiO_3$), sodium methasilicate combined with crystal water ($Na_2SiO_3 \cdot nH_2O$), etc. to generate insoluble amorphous silica.

The addition of sulfuric acid is carried out at a high temperature. Therefore, sulfuric acid should be added carefully so that the drop of sulfuric acid does not splash.

Specially, in order to complete the addition of sulfuric acid in a short time, it is preferred to use sulfuric acid with purity >90%.

The temperature of the filtrate at which sulfuric acid is added is very important. It is preferably 80° C. to 99° C. If sulfuric acid is added at a temperature of less than 80° C. the extraction of silica is delayed and more over, crystalline silica is generated. If sulfuric acid is added at a temperature of higher than 99° C., the produced silica is in a gel phase.

Next, in order to separate off the extracted silica the solution is evaporated, the extracted silica is then dried and thoroughly washed. Through the washing process, soluble impurities are removed to give insoluble silica, which is then dried. The finally obtained silica is high purity amorphous silica.

According to another aspect of the present invention, after completion of adding anhydrous sulfuric acid for extracting amorphous silica, 50% (v/v) hydrochloride solution is further added so as to enhance the yield of silica. The hydrochloride solution helps the nature of the solution to be changed from neutrality to absolute acidity so that un-extracted silica existed in the solution can be extracted. It is preferable to add 50% (v/v) hydrochloride solution in an amount of 100 to 200 weight percents. If the amount is more than 200 weight percents, there is no benefit for the excess amount. If the amount is less than 100 weight percents, the effect is insignificant.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF THE INVENTION

Figure 1:
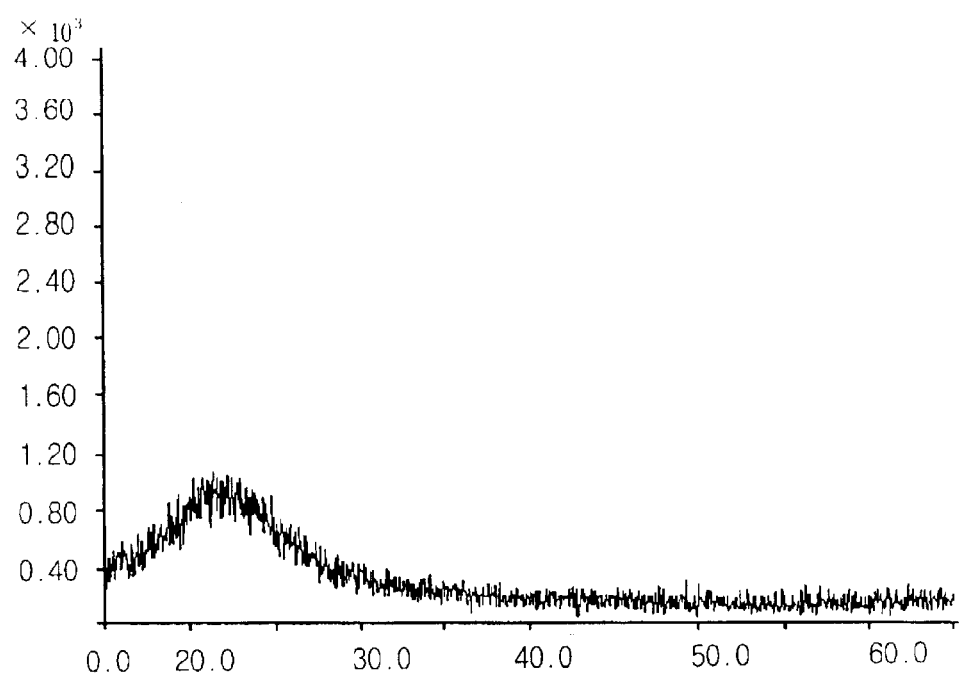
FIG. 1 is a graph showing an X-ray diffraction pattern of the silica extracted according to the present invention.

Having now generally described this invention, the same will be better understood by reference to certain specific examples, which are included herein for purposes of illustration only and are not intended to be limiting of the invention or any embodiment thereof.

EXAMPLES

Examples 1 to 8

Rice hulls and rice straw are carbonized and pulverized to particle size of at least 50 mesh. 1 kg of the pulverized carbide is added to 10% (w/w) sodium hydroxide solution of amounts listed in Table 1 below. The solution is left for 1 hour at 45° C. and then filtrated 3 times. The filtrate is slowly heated by the temperature listed in Table 1 below. At this time, anhydrous sulfuric acid is added dropwise to neutrality. The solution is evaporated, dried, thoroughly washed and dried again at 300° C. to give silica. Fact that is observed during the experiments and yields are shown in Table 1 below.

Example 9

Rice hulls and rice straw are carbonized and pulverized to particle size of at least 50 mesh. 1 kg of the pulverized carbide is added to 10 kg of 10% (w/w) sodium hydroxide solution. The solution is left for 1 hour at 45° C. and then is filtrated 3 times. The filtrate is slowly heated by 95° C. At this time, anhydrous sulfuric acid is added dropwise to neutrality, followed by adding 1.3 kg of 50% (v/v) hydrochloride solution. The solution is evaporated, dried, thoroughly washed and dried again at 300° C. to give silica. Fact that is observed during the experiment and yield is shown in Table 1 below.

TABLE 1

|  | Added amount of 10% (w/w) NaOH Sol. (kg) | Temperature upon addition of anhydrous $H_2SO_4$ | Yield (g) |
| --- | --- | --- | --- |
| Example 1 | 3 | 93 | 100 |
| Example 2 | 5 | 93 | 150 |
| Example 3 | 10 | 93 | 220 |
| Example 4 | 15 | 93 | 230 |
| Example 5 | 17 | 93 | 230 |
| Example 6 | 10 | 70 | 210 |
| Example 7 | 10 | 95 | 230 |
| Example 8 | 10 | 100 | 220 |
| Example 9 | 10 | 95 | 240 |

As seen from the results of Examples 1 to 5, in which the amount of the added sodium hydroxide solution is varied while fixing constantly the temperature when anhydrous sulfuric acid is added, it is noted that the yield of silica is increased by a certain point as the amount of the sodium hydroxide solution is increased but above the point the yield is not increased any more.

From the results of Examples 6 to 8, in which the temperature when anhydrous sulfuric acid is added is varied while fixing the amount of the added sodium hydroxide solution, it is noted that Examples 6 and 8 in which sulfuric acid is added at temperatures out of the range according to the present, silica is produced in the yield similar to that of Example 7 in which sulfuric acid is added at a temperature in the range according to the present invention. However, in practical experiments it requires considerable time to extract silica, particularly even after completion of adding sulfuric acid.

Further, it is found that in Example 8, after completion of adding sulfuric acid, silica is produced in a gel phase. In Example 7 according to the present invention, silica is extracted as soon as anhydrous sulfuric acid is added.

In Example 9, in which hydrochloride solution is further added, the yield of silica increases. It is considered that hydrochloride solution helps the silica which is not yet extracted and remains in solution to be extracted.

The silica of the highest yield, prepared from Example 9 is analyzed for its components and the result is shown in Table 2 below.

Figure 2:
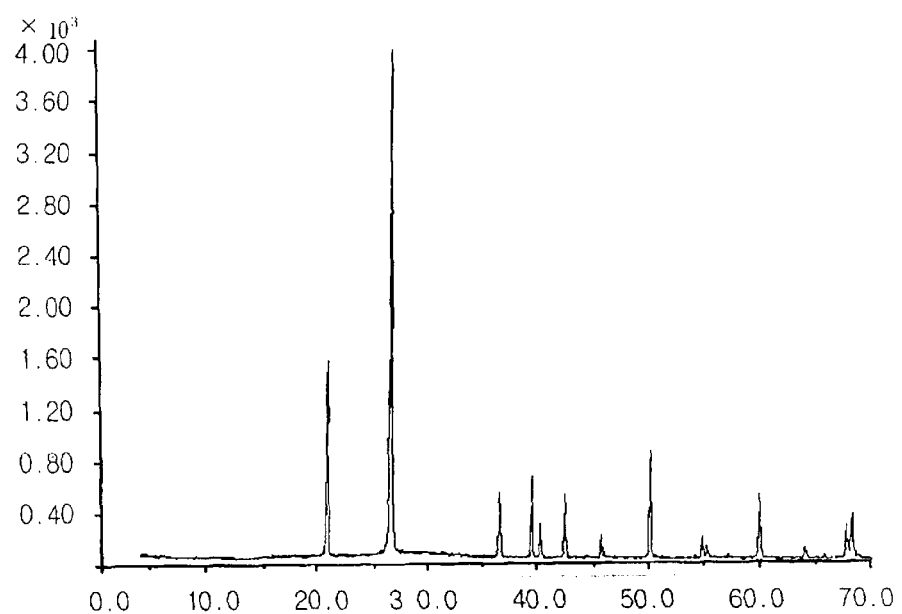
FIG. 2 is a graph showing an X-ray diffraction pattern of the silica produced using minerals.

The results of the X-ray diffraction pattern test for silica produced according to the present invention and silica produced from minerals are shown in FIGS. 1 and 2, respectively.

The X-ray diffraction pattern was obtained in accordance with the standard X-ray diffraction method and radiation source was copper Kα-ray and X-ray tube operating at 30 kV, 40 mA.

TABLE 2

| | SiO$_2$(%) | Al$_2$O$_3$(%) | Fe$_2$O$_3$(%) | TiO$_2$(%) | Others(%) |
|---|---|---|---|---|---|
| Example 9 | 99.93 | 0.052 | 0.005 | 0.010 | 0.003 |

From Table 2, it is noted that silica prepared according to the present invention has purity superior to that prepared from minerals. Accordingly, the silica prepared according to the present invention has advantages of being able to be used as an additive in preparation of those which require high purity, such as cosmetics, medications, semiconductors, films, waxes, fineceramics and the like.

Also, in FIGS. 1 and 2, which shows the X-ray diffraction pattern of the silica prepared according to the present invention and the silica prepared from minerals, respectively, it can be seen that the silica prepared with minerals is formed in crystalline structure whereas the silica prepared according to the present invention is amorphous.

As described above, the present invention is useful to provide silica of high purity extracted from herbaceous plants.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed:

1. A method for extracting silica from herbaceous plants, comprising:

carbonizing a herbaceous plant, pulverizing the resulting carbide of the plant to a size of at least 50 mesh;

adding at least 5% (w/w) aqueous alkaline solution, based on 100 weight percents of the carbide, to the carbide to form a mixture;

maintaining the mixture for 1 hour at about 45° C., and filtering the mixture to obtain a filtrate;

slowly heating the filtrate to a predetermined temperature;

dropping sulfuric acid to the filtrate at the predetermined temperature until the filtrate becomes neutral to form insoluble amorphous silica in the filtrate; and evaporating the filtrate to separate off the amorphous silica and drying the amorphous silica.

2. The method according to claim 1, wherein the aqueous alkaline solution comprises 10%(w/w) aqueous solution of sodium hydroxide.

3. The method according to claim 1, further comprising adding a 50% (v/v) hydrochloric solution to the neutral filtrate.

4. The method according to claim 2, further comprising adding a 50% (v/v) hydrochloric solution to the neutral filtrate.

5. The method according to claim 1, further comprising washing and drying the silica to remove impurities from the silica.

6. The method according to claim 1, wherein the predetermined temperature comprises 80° C. to 99° C.

7. The method according to claim 1, wherein the sulfuric acid has a purity of greater than 90%.

* * * * *